Figure 2:
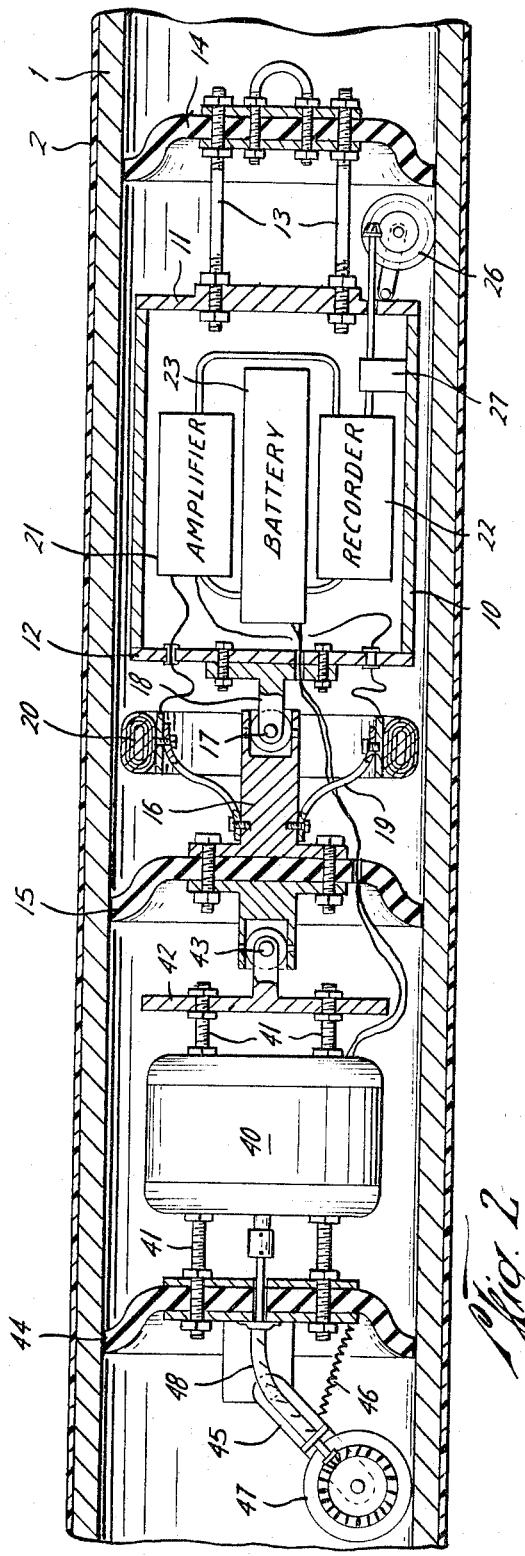

Nov. 8, 1966 W. G. OWNBY 3,284,702
APPARATUS FOR DETECTING COATING HOLIDAYS IN METAL
PIPELINE WALLS UTILIZING HELICALLY WOUND PICK-UP
COILS AND SELF-CONTAINED POWER SYSTEM
Filed April 26, 1963 2 Sheets-Sheet 1
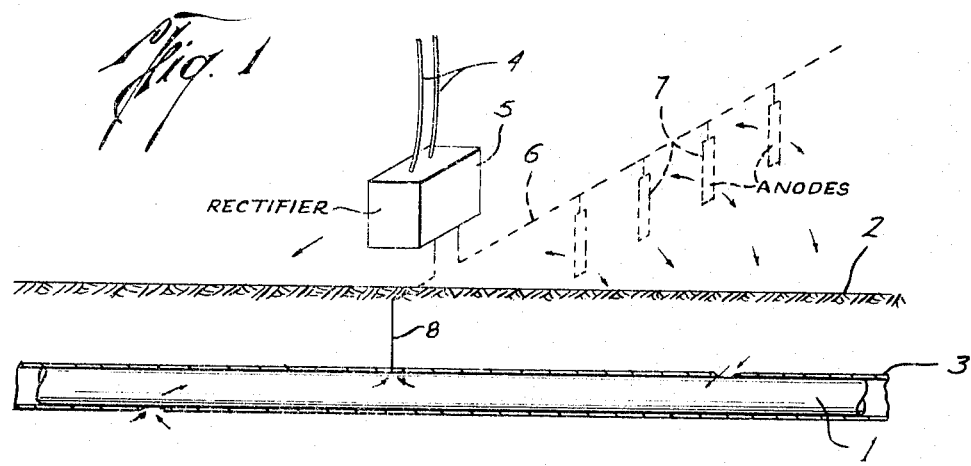
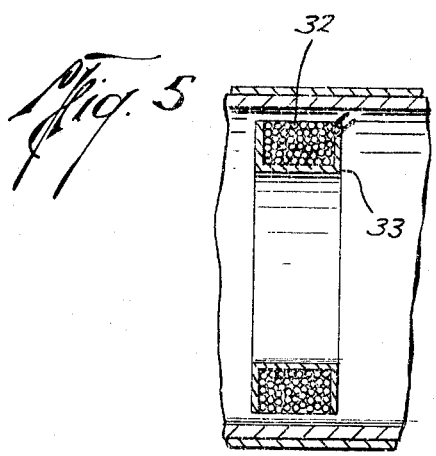
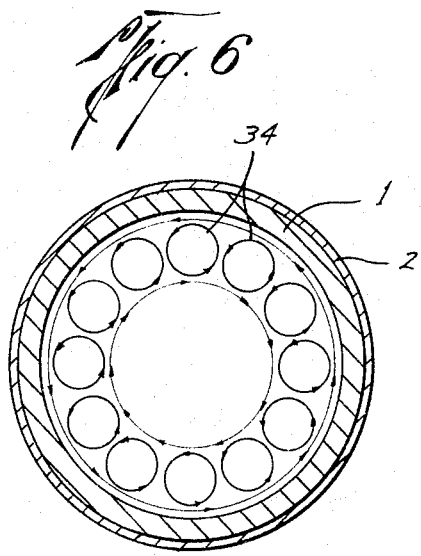
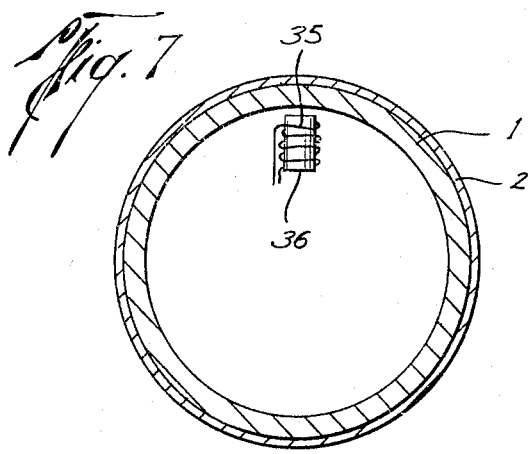
W. G. Ownby
INVENTOR.
BY *[signature]*
ATTORNEY Nov. 8, 1966

W. G. OWNBY 3,284,702

APPARATUS FOR DETECTING COATING HOLIDAYS IN METAL
PIPELINE WALLS UTILIZING HELICALLY WOUND PICK-UP
COILS AND SELF-CONTAINED POWER SYSTEM

Filed April 26, 1963

2 Sheets-Sheet 2

W. G. Ownby
INVENTOR.

BY G C Helmig

ATTORNEY

United States Patent Office 3,284,702
Patented Nov. 8, 1966

3,284,702
APPARATUS FOR DETECTING COATING HOLIDAYS IN METAL PIPELINE WALLS UTILIZING HELICALLY WOUND PICK-UP COILS AND SELF-CONTAINED POWER SYSTEM
Warren G. Ownby, Houston, Tex., assignor to Camco, Incorporated, Houston, Tex., a corporation of Texas
Filed Apr. 26, 1963, Ser. No. 275,915
3 Claims. (Cl. 324—37)

This invention relates to the art of mitigating surface corrosion and surveying for corrosion or the likelihood of the beginning of corrosion in the wall of a pipe line which usually is of ferrous metal and is coated exteriorly within a protective sheath and entrenched or buried in surrounding earth.

Pipe lines for cross-country transportation of fluids are an example of various ferrous structures which have presented problems of wall breakdown and deterioration from corrosion and the need for corrective measures including costly repair or replacement to guard against loss of valuable fluids and interruption of fluid delivery. Corrosion of underground pipe line most often is from galvanic current or the flow of current produced by chemical action between the metal surface and the surrounding soil content.

Resistance to the cause of corrosion can be had by applying a pipe coating, such as bitumen, but coating thin spots and holidays makes for breaks or weaknesses in resistance. Cathodic protection is also a corrosion control practice and involves application of direct current voltage so that current from the source tends to flow from the earth's surface to the wall surface of the pipe and the applied electric current reverses the natural process of corrosion. Although coatings afford protection, they seldom are perfect and are likely to have defective and thin areas or skips and to deteriorate progressively with age and therefore the combination with coating of the application of cathodic protection is justified.

There has been lacking a suitable method and apparatus for reliably and economically monitoring or determining the extent of effectiveness of applied mitigation measures to in situ pipe. To obtain such information and warning of when and where corrosion occurs or is likely to begin would be of great value and enable a watch for subsequent and progressive deterioration of coatings at holidays for the timely institution of corrective measures. An important phase of investigations of corrosion conditions in pipe to which cathodic protection has been applied is the measure of electrical potentials and currents in a given length of pipe and the interpretation of the measurement for a determination of points or areas where corrosion has been or is occurring. In the case of a buried and coated line installation to which cathodic protection current is supplied, the current flow will be determined by the total conductance of the pipe coating after the initial charge transient. With a well coated line, total conductance will be low and hence total protective current will be low. A lessening of pipe wall insulation from the earth upon coating deterioration or because of an increase in coating discontinuity will increase cathodic current to give protection. Slight changes in current demand, as from a newly developed holiday, will be of little use in locating the flow with equipment heretofore available. Such equipment, for example, may be a reference cell which is carried along the line and used for locating galvanic hot spots by placing the cell at intervals both over and to one side of the line. That type of survey at ground level is time consuming and costly and is not sufficiently precise to pinpoint coating failures and early stages of corrosion.

An important object of the present invention is to provide for convenient and ready determination at relatively low cost of locations along a buried pipe line having both coating protection and cathodic protection, where the cathodic current enters the pipe from its surrounding soil and thereby indicates coating failures or discontinuities.

Another object is to provide an improved pipe pig for travel through a buried pipe under force of the fluid being transported and without interference to such transportation and for carrying instrumentation which during pipe traverse and without direct contact with the pipe detects cathodic currents and measures variations in magnetic fields set up by current flow along the pipe wall as an indication of pipe line condition with reference to coating failures and the likelihood and extent of corrosion occurrence.

A further object of the invention is to provide pipe traversing mechanism having instrumentation to record in time-place reference the detection of failures in protective pipe coatings.

A still further object is to provide means for utilization of otherwise wasted ripple power in rectifier cathodic protection circuits as such ripple power marks or tags the presence of cathodic current flow.

Figure 4:
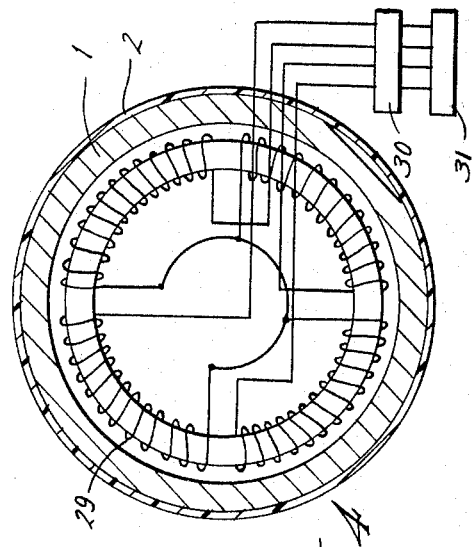
Figure 3:
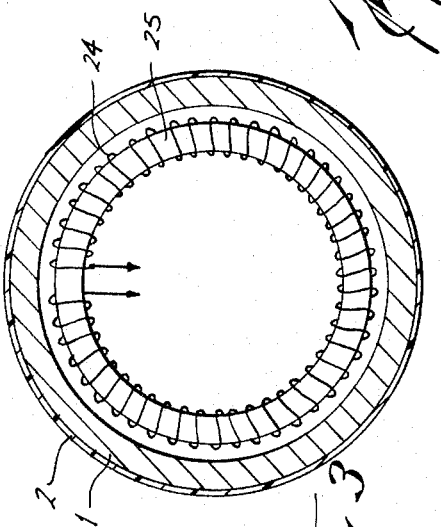

In the accompanying drawing:
FIG. 1 is a perspective and part sectional view of a length of buried pipe line having coating and cathodic protection;
FIG. 2 is an enlarged longitudinal section of the improved inspection device in operating relation to the wall of a buried pipe line;
FIG. 3 is a view of a pipe in transverse section and of a flux sensing or detector device in the form of a toroidally wound coil in co-operating juxtaposed relation with the interior surface of the pipe wall;
FIG. 4 is a view similar to FIG. 3 but showing a circular succession of segmental and toroidally wound pick-up coil;
FIG. 5 is a longitudinal section of a pick-up coil whose windings are annularly related to the pipe;
FIG. 6 is a transverse section of pipe with a series of pick-up coils wound on axes parallel to one another and to the longitudinal pipe axis; and
FIG. 7 is a transverse pipe section in which a pick-up coil is located and has its windings about an axis perpendicular to the interior surface of the pipe.

Referring first to FIG. 1, a steel pipe 1 is shown buried in the earth 2 and sheathed in a protective coating or wrapping 3 which insulates the exterior pipe surface from the surrounding soil. A cathodic protection system includes a source of alternating current joined by conductor wires 4 to a rectifier 5 from which a direct current circuit can be completed from the rectifier positive terminal through a conductor 6 to a bank of ground embedded anodes 7; the soil; the pipe and the negative terminal connecting wire 8. Current flow after the initial charging transient is dependent on total conductance of the coating and will be low in the case of a well coated pipe whose conductance is low.

Should insulation of the metal pipe surface be lessened as holidays occur or develop with deterioration, cathodic current increases to afford the needed protection against corrosion of the wall surface. Current reaching the pipe and flowing through the pipe wall applies electric energy that tends to reverse the natural process of corrosion and hence provides mitigation of corrosion. A newly developed holiday or one which still is not of great significance with respect to the progress of corrosion may demand a protective current increase which is but a small fraction of the total supply and with the equipment heretofore available is usually indiscernible. Since the pipe metal is electrically insulated from the earth except at holidays or faults, the current seeks the least resistance route through the soil to each uninsulated surface and through the pipe wall to the negative terminal of the rectifier. Distribution of current along the pipe depends upon location and resistance of each coating fault and at such point there will exist current concentration. Thus variations in current concentration are indicative of faults, their locations and degrees of imperfection.

The conventional indirect means of measuring line current distribution, as by indiscriminatively driving contact bars through the upper fill and insulating coating and then taking measurements of voltages between spaced apart probes, takes considerable time and is unreliable and often highly inaccurate. The present proposal is to take advantage of the principle that where there is current flow there is an associated magnetic field and that the intensity of the field reflects information of value. Thus, near the inside of a steel pipe wall a magnetic intensity is manifest when current flows through the pipe wall and I have discovered that field intensities resulting from protective cathodic curernts are sufficiently greater than random field intensities to provide adequate signals for interpretative information.

As indicated by arrows in FIG. 1, cathodic current flows through the soil of the ground toward the pipe and seeks paths of least resistance to each and every uninsulated and poorly coated pipe surface and the distribution of current along the pipe depends upon location and low resistances of every coating fault and at such places there will exist current concentrations. Such variations indicate faults, their location and degrees of imperfection, and for detection and recordation cathodic protection current flowing in coated and buried pipe lines and without interference to or stoppage of product flow can be measured from within the pipe with the herein disclosed instrumentation when the same is run through a length of cathodically protected pipe. The inspection equipment is embodied in a pig or piston-type assembly to be propelled or pumped forward under line pressure.

FIG. 2 shows a piston assembly including a main ring 10 preferably in the form of a cylinder having opposite end closure walls 11 and 12. Projecting forwardly from the front closure wall 11 are a set of spacer bars 13 for the mounting of a flexible and cupped disk 14 whose expansible periphery has a sealed slide fit bearing on the interior surface of the pipe wall. A similar cupped disk 15 is located in rearwardly spaced relation with the cylindrical housing frame 10 and has a forwardly projecting attachment bar 16 swivelly connected as by a universal-type joint 17 with a tie bar 18 on the rear closure wall 12. The swivel joint 17 affords a degree of flexibility for negotiation of bends in the line of the pipe, as does also each flexible piston wall 14 and 15, although there will be sufficient stiffness in these flexible parts to preclude unwanted sag of the assembly in the region of the joint 17.

A set of spring arms 19 extend forwardly and outwardly from the attachment bar 16 and provide a cushion mounting at their outer ends for a flux sensing or detector device 20. This detector device 20 is an annular pick-up coil whose perimeter is of a radial dimension only slightly less than that of the internal pipe wall so as to be in closely spaced proximity to the inside pipe wall and within the influence of magnetic flux protruded inwardly at the wall surface. Detector response is transmitted through suitable connections to an amplifier 21 and onto a recorder 22 for indicating measurements of flux sensed. Current from a battery 23 powers both the amplifier 21 and the recorder 22 and with them affords a subassembly unit protectively enclosed within the cylindrical housing 10.

As illustrated in FIG. 3, the sensing element includes a coil 24 whose windings extend toroidally throughout a full circle inside the pipe and the outermost portions of the coil turns are near the pipe wall for linking the wall-hovering flux from magnetic fields of pipe current. Preferably, the coil surrounds an iron core 25 and constitutes a passive pick-up element which is ineffective in detecting pure direct current line flow resulting from galvanic corrosion or sacrificial anode cathodic protection inasmuch as the rate of flux linkages would be too small. When used in a line being supplied with cathodic protection current from a rectifier, the toroidal coil will encounter direct currents with ripple. Ripple has been defined as an alternating current component in the direct current output of a rectifier and represents wasted power in a cathodic protection process. The detector coil 24 takes advantage of the ripple power associated with or tagging cathodic current supplied by rectifiers.

Incidental comment is here made that in single-phase bridge rectifier cathodic current protection circuits, approximately nineteen percent of the output power is wasted in the ripple component, which is at a frequency twice that of the fundamental power supply. In three-phase rectifiers, about one and a half percent of the output power is wasted in the ripple component, which is at a frequency of six times that of the fundamental power supply. The toroidal coil of FIG. 3 detects the ripple component associated with cathodic line currents and the amplifier is chosen to selectively amplify the ripple frequency component more than other frequencies.

Corrosion survey data recorded is here tied to its location in the pipe by means of a rotatable pipe tracking wheel 26 mounted by a hinged lever arm on the cylinder end wall 11 for traction drive incident to pig travel and provided with a train of transmission gearing and shafting indicated generally at 27 for operating suitable means within the recorder 22 for marking the distance traveled by the pig in any desired units of length measurement.

The toroidal pick-up coil 24 measures longitudinal line current through the pipe line wall section at any position and for most purposes the recorded indications will be adequate for showing pipe condition and points needing remedial attention. Should more precise sampling of certain pipe areas be required, other windings can be adopted. Should it be desirable, for example, to investigate current in a particular circular sector of the pipe wall, as sometimes is called for as in instances where the coating condition on the underside of the pipe in relation to other sectors is in question, then the pick-up coil can be of any suitable number of circular segments, each of desired circular or arcuate length. Thus FIG. 4 shows a full circular complement of four quarter-length coils 29, each scanning a particular pipe sector. Several signals, or in other words, one from each coil, will be transmitted through connector leads and amplified, as at 30, and indicated at the multiple channel recorder 31.

Toroidally wound pick-up coils are generally to be preferred because the turns provide maximum linkage with flux resulting from the longitudinal component of line currents. However, cathodic currents can be other than longitudinal. Thus, at a coating holiday the current from the soil and into the pipe will tend to concentrate and current vectors near any holiday are three-dimensional. Current flows radially or toward the inside wall surface for distribution compatible with least opposition. Current flows circumferentially or around the pipe as it distributes itself to most effectively use the cylindrical pipe wall. Current flows longitudinally or down the pipe because of the directed driving potential. The associated magnetic intensity is directed at right angles to any such directions of current flow.

One coil arrangement catering to magnetic intensity vectors or flux resulting from circumferential currents is shown in FIG. 5 as involving a circularly extended wire coil 32 wound within an annularly grooved carrier ring and core 33 concentric to the axis of the pipe and of a diameter to place the coil perimeter closely adjacent the inside surface of the pipe wall. Its single concentric winding yields a maximum output signal from fields produced by circumferential currents and when connected with the recorder of the pig of FIG. 2 and run through pipe it will scan the total inside pipe wall, grossly indicating and recording coating flaws about a given cross-section traversed at any instant. Since current vectors circumferentially directed exist only at flaws, the coil responds discriminately to their fields and indicates flaws qualitatively in time-place reference along the pipe.

Instead of a single circumferentially extending wire coil concentric to the cylindrical pipe wall throughout its full circle, a circular succession of several coils 34 (FIG. 6) is contemplated and each of whose circumferentially extending wire will be either looped through a given arcuate length or follow a true circle, as in FIG. 6. Each coil separately scans its adjoining pipe wall so that the multiple coil arrangement provides divided or sectional scanning. In any such properly connected multiple coil arrangement and because of their reverse direction inner turns, there will be a forced discrimination to directed flux hovering the pipe's inner wall as opposed to directed flux residing farther from the wall.

For the radial current vector, the flux is confined to the pipe wall and hence is not conveniently detectable. This property can be advantageously utilized by employing a coil oriented as in FIG. 7 where the coil 35 of wire is wound on an axis extending substantially radially of the pipe wall and about a core 36. This single radial search coil will find utility as a probe for pinpointing soil to pipe current flow. Because of orientation, it will tend to ignore fields from radial currents, circumferential currents and longitudinal currents. Where current enters the pipe wall from the outside soil, this radial coil probe being located inside and just opposite the entry point, will produce a signal null or minimum output. For all other rear positions, the coil will produce an output which can be measured.

Referring again to FIG. 2, an arrangement is shown suitable for supplying operating current to the recording instrumentation of the carrier pig and in response to pig travel which will be especially feasible for pig travel over fairly long distances between entry and exit stations in the pipe line. Such current source consists of an alternator or generator 40 having a conductor cable leading to the battery 23 for maintenance of a proper battery charge as needed for operation of the amplifier 21 and recorder 22. The generator unit is in the form of a trailer assembly to be detachably coupled behind to form a part of the previously described pig assembly. Generator suspension rods 41 project forwardly and rearwardly from the generator body and the forward rod connects with a supporting spider or plate 42 having a swivel joint connection 43 with the adjacent pipe engaging cupped disk 15. The rearwardly projecting rods 41 connect with and are borne by a pipe engaging cupped disk 44 which includes a bracket pivotally mounting the wheel supporting lever arm 45 which is yieldably biased by a spring 46 toward the pipe wall. A pipe tracking wheel or roller 47 rotates on a transverse axle carried by the lever 45 and has suitable drive transmitting connection including a flexible shaft 48 extending forwardly through the piston disk 44 and being coupled with the generator shaft so as to drive the generator by reason of the forward movement of the pig and the drive of the wheel 47 by reason of its engagement with the pipe.

The foregoing specific description of a particularized embodiment of the invention is intended to be in full compliance with the patent statute but the scope of the invention is that encompassed by the attached claims.

What is claimed is:

1. An apparatus for detecting coating holidays in a protectively coated metallic wall pipeline buried in the ground in which a cathodic protective system having one terminal directly connected to the metallic wall and the other terminal active through the ground over a given lentgh of coated pipeline whereby a circuit of cathodic current will be completed through the wall upon current passage into the wall at the occurrence of a coating holiday comprising,
 a magnetic flux detector adapted to be run through said given length of pipeline in a traversing relation with the metallic wall,
 an electrically actuated flux measuring recorder connected to said detector,
 a battery connected to the recorder,
 current generating means connected to the battery for charging the battery, and
 drive mechanism for the generating means engageable with the metallic wall and arranged for driving the generating means in response to travel of the apparatus relative to the pipeline.

2. Apparatus for detecting coating holidays in a protectively coated metallic wall pipeline buried in the ground having a cathodic protection system having one terminal directly connected with the metallic wall and the other terminal active through the ground over a given length of coated pipeline whereby a circuit of cathodic current will be completed through the wall upon current passage into the wall at the occurrence of a coating holiday comprising,
 a magnetic flux detector including a pickup coil which is helically wound on a ring shaped core and whose perimeter is of a size to extend in closely spaced proximity to the interior surface of the pipe wall,
 means mounting the helically wound coil to present the same in concentric relation to the pipeline,
 an electrically actuated recorder connected to the pickup coil,
 a source of actuating current connected to the recorder, and
 means connected to the recorder and actuatable in response to travel of the apparatus for recording the distance traveled.

3. Apparatus for detecting coating holidays in a protectively coated metallic wall pipeline buried in the ground having a cathodic protection system having one terminal directly connected with the metallic wall and the other terminal active through the ground over a given length of coated pipeline whereby a circuit of cathodic current will be completed through the wall upon current passage into the wall at the occurrence of a coating holiday comprising,
 a magnetic flux detector including a series of circumferentially spaced individual pickup coils whose windings are helically wound on a ring shaped core and are located for substantially concentric and closely spaced proximity to the interior surface of the pipe wall,
 an electrically actuated recorder,
 means separately connecting each spaced coil to the recorder for indication of individual coil response to the flux detector,
 a source of actuating current connected to the recorder, and
 means connected to the recorder and actuatable in response to travel of the apparatus for recording the distance traveled.

References Cited by the Examiner
UNITED STATES PATENTS

| | | | |
|---|---|---|---|
| 2,770,773 | 11/1956 | Cooley | 324—34 |
| 2,790,140 | 4/1957 | Bender | 324—34 |
| 2,940,302 | 6/1960 | Scherbatskoy | 324—37 |
| 2,992,390 | 7/1961 | De Witte | 324—34 |
| 3,189,819 | 6/1965 | Schmidt | 324—37 |

WALTER L. CARLSON, *Primary Examiner.*

RICHARD B. WILKINSON, *Examiner.*

R. J. CORCORAN, *Assistant Examiner.*